May 23, 1944. R. T. HOSKING 2,349,591
SELF-LOCKING SCREW DEVICE
Filed Jan. 23, 1940 2 Sheets-Sheet 2
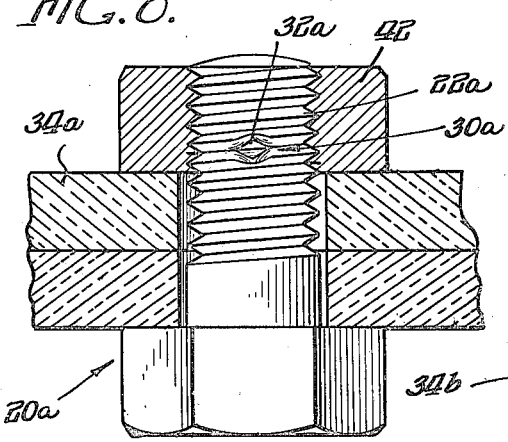
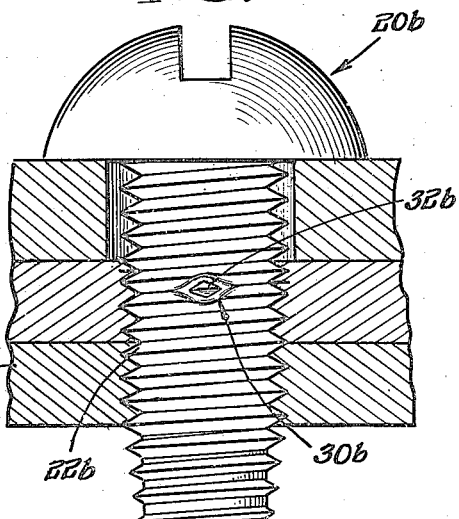
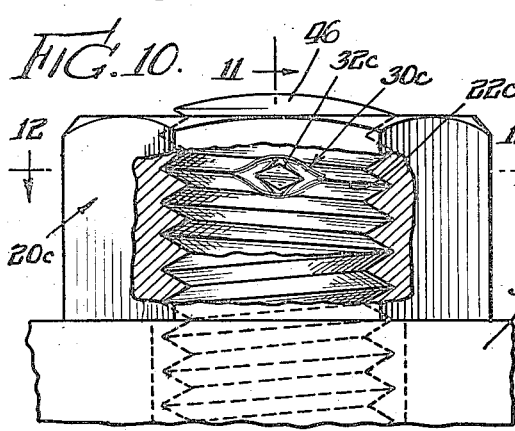
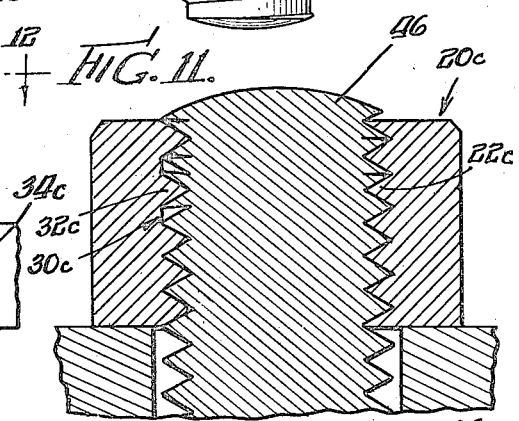
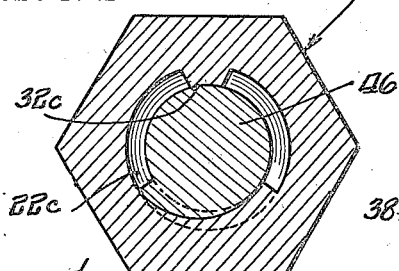
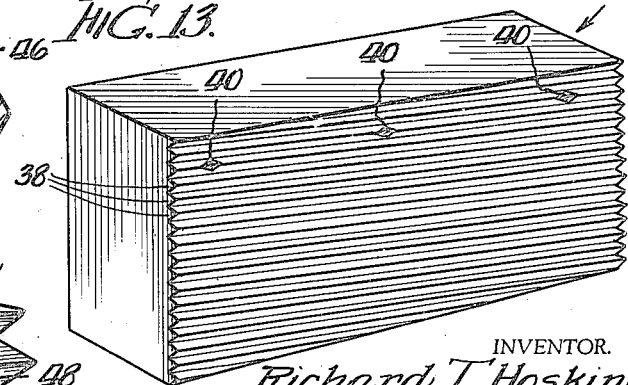
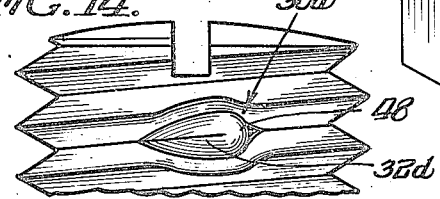
INVENTOR.
Richard T. Hosking
BY Cox & Moore
ATTORNEYS.

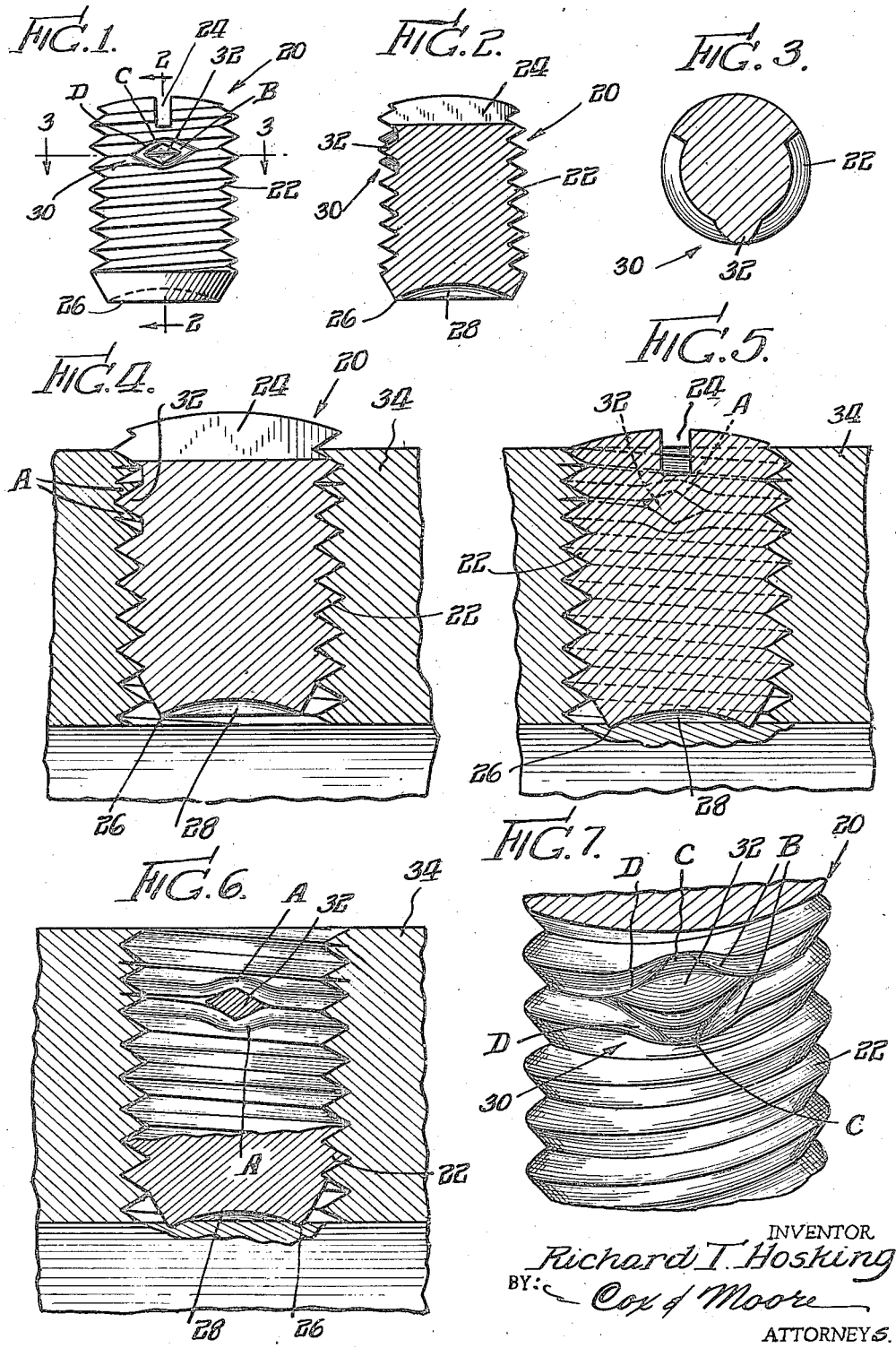

Patented May 23, 1944

2,349,591

UNITED STATES PATENT OFFICE 2,349,591

SELF-LOCKING SCREW DEVICE

Richard T. Hosking, Wilmette, Ill., assignor, by mesne assignments, to Illinois Tool Works, Chicago, Ill., a corporation of Illinois Application January 23, 1940, Serial No. 315,215

14 Claims. (Cl. 151—22)

This invention relates generally to thread locking devices but more particularly to self-locking fasteners of the screw threaded type equipped with thread locking means.

Various methods have heretofore been employed to secure screws and nuts against loosening. In some instances auxiliary locking devices such as lock washers are employed beneath the clamping surface of the fastener. In my recently issued Patents Nos. 2,096,040 and 2,096,041 I have disclosed a method of fastening which dispenses with the use of lock washers and contemplates a protuberance associated with the clamping surface of the fastener for cutting into the surface of the work. In locking arrangements of the type mentioned above, it is necessary to cause a cut or indentation in the work surface in order to anchor the fastener against loosening. There are numerous instances where it is desirable to secure a threaded element such as a screw or nut against loosening without subjecting the work surface to any disfigurement. Thus, for example, in instances where a clamping surface is to be tightened against a plastic material or other similar material, it is impractical to employ a locking device which depends for its locking effectiveness upon the embedding action of teeth or projections into the surface of the work. It is one of the important objects of the present invention to provide a self-locking threaded fastener which obviates the above mentioned difficulties and to this end I propose to employ a projection in operative association with the thread convolutions of one element which is adapted to cut or dig into a thread convolution of a companion fastener element so as to effectively lock the parts against inadvertent retrograde rotation.

More specifically, my invention contemplates an arrangement, as set forth above, wherein the projection on one of the complementary threaded elements is so positioned that when the elements are relatively rotated in a tightening direction, said projection will actually cut or split a thread convolution on the other element so as to cause the projection to interlock with the split or divided thread and thus prevent inadvertent loosening of the parts.

It is a further object of the present invention to provide a self-locking threaded fastener of extremely economical design and to this end I propose to provide a thread cutting or splitting element of the type referred to above which may be produced by a die simultaneously with the rolling of the thread on the fastener.

The invention also contemplates self-locking screws of the headless type such as set screws equipped with a thread engaging protuberance or projection of the type referred to above, as well as thread forming or thread cutting screws equipped with such projections or protuberances.

The foregoing and numerous other objects and advantages will be more apparent when considered in connection with the accompanying drawings, wherein—

Fig. 1 is a side elevational view of a set screw embodying the self-locking feature of the present invention;

Fig. 2 is a central, vertical, sectional view taken substantially along the line 2—2 of Fig. 1 to more clearly illustrate the cross-sectional contour of the thread engaging protuberance or projection;

Fig. 3 is a transverse, horizontal, sectional view taken substantially along the line 3—3 of Fig. 1;

Fig. 4 is an enlarged vertical, sectional view disclosing the set screw of Figs. 1 to 3, inclusive, partially inserted within a work piece, the section of the screw being taken similarly to the section shown in Fig. 2 so as to more clearly illustrate the manner in which the thread convolution of the work is actually split or divided by the locking protuberance on the set screw;

Fig. 5 is a vertical, sectional view similar to Fig. 4 showing the screw after it has been finally tightened against the work piece so as to move the locking projection from the position shown in Fig. 4 through 90° to the position shown in Fig. 5;

Fig. 6 is a view similar to Fig. 5 with the set screw removed and a section of the protuberance remaining to more clearly illustrate the manner in which said protuberance or projection actually cuts or separates the thread convolutions of the work and the manner in which the trailing sections of the severed thread convolution close together and provide a locking abutment;

Fig. 7 is an enlarged fragmentary perspective view of the screw shown in Figs. 1 to 5, inclusive, to more clearly illustrate the structural arrangement of the thread cutting and locking projection;

Fig. 8 discloses a modified use of the locking arrangement of the previous figures, said locking arrangement being shown on a bolt and designed to lockingly engage with the thread convolution of a nut;

Fig. 9 is a vertical, sectional view of work pieces secured together by a thread cutting screw, the screw being equipped with the thread locking feature illustrated in the previous figures;

Fig. 10 is a side elevational view of a combined nut and screw arrangement wherein the nut is provided with the locking projection as distinguished from the screw shown in the previously described figures, the central portion of the nut and the screw being broken away to more clearly illustrate the locking protuberance on the nut which would otherwise be hidden;

Fig. 11 is a vertical, sectional view taken substantially along the line 11—11 of Fig. 10;

Fig. 12 is a transverse, sectional view taken substantially along the line 12—12 of Fig. 10;

Fig. 13 is a perspective view of a thread rolling die of the type which may be employed to simultaneously roll a thread and a locking projection on a screw blank; and Fig. 14 is a fragmentary elevational view of a screw element equipped with a thread locking protuberance of modified form which is provided with a more abrupt trailing extremity so as to increase resistance to forces tending to loosen the screw.

Referring now to the drawings more in detail wherein like numerals designate similar parts throughout the various figures, it will be seen that one embodiment of the invention as illustrated in Figs. 1 to 7, inclusive, comprises a set screw designated generally by the numeral 20. The set screw 20 comprises a threaded portion 22 which is provided with a recess 24 at one extremity to receive a suitable turning tool or screw driver. Other forms of recess such as the conventional counter-sunk hexagonal recess (not shown) may also be used in instances where requirements demand such a construction. The opposite extremity of the set screw 20 is provided with the conventional work engaging annular edge 26, said extremity being cupped as at 28.

The screw 20 is provided with a locking section designated generally by the numeral 30. This locking section 30 includes a protuberance or projection 32 which is disposed in helical alinement with the valley of adjacent thread convolutions, as clearly illustrated in Figs. 1 and 7. In the disclosed embodiment, the projection 32 is of a height at its intermediate portion which is substantially equal to the height of the screw thread; however, the height of the projection will be determined by the type and size of screw with which it is associated. In the embodiment disclosed in Figs. 1 to 7, inclusive, the projection is V-shaped in cross-section taken longitudinally of the screw body and it diminishes in height as the projection extends circumferentially in opposite directions. It will thus be apparent that when the screw 20 is inserted within a threaded aperture and the projection 32 is brought into engagement with the complementary thread of the work, said projection will actually cut its way through the thread and thus cause the thread to be longitudinally divided or severed, as will be more clearly understood from the description which follows.

In Fig. 4 I have disclosed in cross-section the screw of Fig. 1 inserted within a threaded work piece 34. As the projection 32 is brought into engagement with the crest of the complementary thread convolution in the work piece 34, said crest is engaged by the central outer edge of the projection and this is followed by an actual splitting or severing of the thread convolution of the work piece. The portion of the thread convolution which is severed and separated by the projection 32 and which is positioned on opposite sides of said projection is indicated in Figs. 4 and 6 by the letter A. It will be apparent that as the projection 32 cuts its way through the complementary thread convolution in the work, the severed sections of the thread toward the trailing extremity of the projection automatically close together due to the converging thread portions or surfaces B illustrated in Fig. 7. The sections of the screw thread indicated by the letter C are relieved as indicated in Fig. 7 to accommodate the displaced sections A in the work.

From the foregoing it will be apparent that as the projection 32 cuts its way through the thread convolution of the work during the rotation of the screw in a clockwise direction, as viewed in plan (Figs. 1 to 7, inclusive), the thread convolution of the work is split and forced laterally as indicated by the thread portions A, Fig. 6, into the areas or confines C shown in Fig. 7, and the portions of the thread in the work toward the trailing extremity of the projection 32 close together due to the engagement of the thread surfaces B of the screw with the complementary severed sections of the screw thread in the work. The enveloping of the projection 32 by the split or separated sections of the screw thread of the work provides an effective lock against inadvertent retrograde movement of the screw. In other words, in order to loosen the screw after it has been tightened to the position shown in Figs. 5 and 6, it is necessary to overcome the binding action of the separated sections of the thread in the work upon the opposite surfaces of the projection 32. In order to facilitate the cutting or severing of the work thread, it is obviously necessary that the projection 32 be harder than the work material. This may be accomplished by either hardening the entire screw body or by providing a projection which is in and of itself harder than the work material.

Attention is directed to the fact that the locking section 30 which comprises the projection or protuberance 32 and the thread surfaces associated therewith is so designed as to enable the production thereof by a simple extrusion process. One of the most common methods for producing screw threads includes the use of thread rolling dies of the type shown in Fig. 13 and designated generally by the numeral 36. It is the usual practice to employ a pair of dies of the type shown in Fig. 13, one being held stationary and the other movable longitudinally with respect to the other die member. The face of the die is provided with a series of serrations 38 which conform with the type of thread to be formed on the screw blank. In accordance with the present invention I propose to form die block 36 with indentations 40 which form counterparts of the locking section 30 previously described.

Thus, as the screw blank is rolled between a pair of die blocks the locking section 30 on the screw will be extruded contemporaneously with the extrusion of the thread. Obviously the invention is not limited to the use of one locking section on the screw. It may be desirable to employ a plurality of locking sections and in this event it is only necessary to increase the number of counterpart indentations on the die block.

In Fig. 8 I have disclosed the application of the invention to a bolt as distinguished from the set screw described in Figs. 1 to 7, inclusive. The bolt in Fig. 8 is designated generally by the numeral 20a which is provided with a threaded portion or body 22a. A locking section 30a similar to the locking section 30 just described is formed in the threaded shank of the screw. It is preferable to so position the locking section 30a that the protuberance or projection 32a thereof will engage and thereby cut or sever a thread convolution in the nut 42. Thus, after the threaded shank of the bolt is inserted through a work piece 34a and the nut 42 applied, the protuberance 32a will lock the nut 42 against inadvertent retrograde rotation in the same manner that the projection 32 locks the set screw 20 against loosening. In the set screw 20 the projection is preferably provided near the upper extremity of the screw so that a substantial portion of the screw may be inserted within the threaded aperture of the work before the locking projection 32 engages the thread convolution of the work. Likewise in the embodiment of the invention disclosed in Fig. 8 the projection 32a is so positioned that the nut 42 may be applied for a considerable distance upon the screw shank before the projection lockingly engages the thread convolution of the nut.

In Fig. 9 the locking feature heretofore described is shown in operative association with a hardened thread forming screw, said screw being designated generally by the numeral 20b. The screw shank 22b is formed with a locking section 30b similar in structural characteristics to the locking sections 30 and 30a heretofore described and includes a projection 32b. The screw shank 22b is provided with hardened threads to enable a thread to be formed in the work piece 34b. After the screw shank 22b has been inserted a substantial distance into the work piece the locking projection 32b engages the uppermost thread convolution of the work and becomes lockingly associated therewith. The interlocking of the projection 32b with the complementary severed thread portions of the work serves to secure the screw against inadvertent retrograde movement.

In Figs. 10, 11 and 12 the locking section heretofore described is shown in association with the inner threaded periphery of a nut 20c. In the previously described embodiment the locking section has been formed on the screw member whereas in Fig. 10 a locking section 30c is formed on the threaded portion 22c of the nut 20c. The projection 32c on the nut is hardened so that when the nut has been applied a considerable distance upon a screw member 46, the projection 32c will engage and sever the thread convolution toward the upper extremity of the screw. When the nut 20c has been finally tightened against the work 34c, the projection 32c will have so severed the thread and interlocked with the severed thread as to secure the nut 20c against loosening.

If it is desired to increase the resistance against retrograde rotation offered by the locking sections just described, the modified locking section 30d as illustrated in Fig. 14 may be employed. This locking section 30d is similar to the locking sections previously described, with the exception that the trailing portion thereof, viz., that portion which is farthest removed from the extremity of the projection 32d which cuts into the thread of the work, may be formed with a blunt extremity 48. The locking projections previously described are formed with extremities of V-shaped cross-section as distinguished from the blunt extremity 48. This blunt extremity 48 serves to set up increased resistance to forces tending to rotate the screw in a reverse direction.

Attention is also directed to the similarity in shape of the opposite extremities of the cutting elements 32, 32a, 32b and 32c. By having the extremity of these projections so arranged it is possible not only to effect the cutting or splitting action during the tightening of the threaded element but it is also possible to remove or loosen the threaded element by applying sufficient force in a retrograde direction. Thus, for example, as the set screw shown in Figs. 1 to 7, inclusive, is turned in a reverse direction by the application of sufficient force, the extremity of the projection 32 which has heretofore been referred to as the trailing extremity, becomes the advancing extremity and moves through the previously severed thread convolution. In this connection it will be noted that wall portions or surfaces D positioned on opposite sides of the projection 32 oppositely positioned from the wall portions or surfaces B serve to close the severed thread portions. Thus, after the screw has been removed from the work the previously severed or divided thread convolutions will have been shifted together, thereby enabling the subsequent insertion of a screw in the work. Even the projection 32d shown in Fig. 14, by the application of sufficient force to its associated screw element, may be shifted in reverse direction and the locking section, of which the projection 32d forms a part, will cause the severed sections of the thread convolutions to be automatically closed together, as just described. Of course, by having a cutting edge provided at both extremities of the projection, the ease with which the screw may be shifted in reverse direction by the application of a turning tool thereto is materially facilitated.

From the foregoing it will be apparent that the invention contemplated hereby presents a novel, improved thread locking means. Also the invention presents a locking device which precludes the necessity of disfiguring the clamping surface of a work piece due to the fact that all of the locking takes place in the screw thread as distinguished from the clamping side of a screw head or nut. As previously pointed out this advantage of the present invention over locking devices heretofore employed is important in instances where disfigurement of work surfaces must be avoided. This is particularly significant in the field of aeroplane production where it is very essential to avoid surface disfigurement because most surfaces of an aeroplane are rust-proofed. In present day aeroplane construction, wires or other similar fastening means are employed to prevent nuts and screws from falling off. The present invention will insure such fasteners from loosening without the use of any auxiliary fastening devices or without the use of any locking projections which depend for their locking effectiveness upon indentations made in the work surface. It will be obvious from the foregoing description that the invention has a wide range of applications inasmuch as it can be used on bolts, cap screws, stud bolts, nuts, thread cutting screws, etc. The economy with which locking sections may be applied to the screw threads, when compared with especially configurated locking devices which have heretofore been employed, renders my improved self-locking fasteners most practical from the standpoint of manufacture. Not only does the invention make for economy in manufacture but also provides a fastener with an efficiently operative locking section. While the invention has been shown as applied to screw threaded fasteners, it is capable of a wide range of applications in instances where any screw thread is to be locked against relative rotation with respect to a companion screw thread.

It is well known that bolts under certain operating conditions experience longitudinal stretching. When conventional locking devices beneath the clamping surface of a bolt head or nut are employed, this longitudinal stretching of the bolt will obviously tend to reduce the locking effectiveness of such device. By employing the invention described herein, the stretching of the screw shank will not in any way impair the effectiveness of the locking section. Thus, by employing a locking section which is associated with the thread convolutions of one element and is adapted to act upon the thread convolutions of a companion element or work piece, the danger of loosening resulting from screw elongation is eliminated. Attention is again directed to the disclosure in Fig. 4 wherein the set screw is shown partially inserted within a companion threaded member or work piece 34. One of the problems incident to the sale of devices requiring the use of set screws is that of insuring against loss of screws before the article reaches the ultimate consumer. In most instances screws are placed in a separate envelope which accompanies the part in which they are to be subsequently inserted. My invention enables a set screw or any other screw to be partially inserted within the work as illustrated in Fig. 4 and in this position the screw is absolutely secure against retrograde rotation or loosening. The screw and its associated part or work piece may be shipped together as a unit, it being only necessary for the purchaser to apply a final tightening movement to the screw in order to lock the part in place. There are numerous instances where screws are to be inserted by the ultimate user, and in all such instances the invention may be employed to secure the screw in partially assembled relation to the work without any danger of becoming loose.

Thus, the invention is by no means limited to the embodiments disclosed herein but is capable of other applications, modifications and changes without departing from the spirit and scope of the appended claims. In the claims reference is made to a locking section including a "relatively hard" element associated with a thread convolution of the threaded body. The term "relatively hard" is employed to indicate that the element (for example, the element 32) is relatively harder than the work piece or threaded member 34 in order to render the element operative as a thread cutting or slitting instrumentality.

The invention is hereby claimed as follows:

1. A self-locking screw threaded device including a threaded body, and a locking section including a relatively hard element integral with said body and displaced laterally with respect to an adjacent normal thread convolution, said element having an advancing edge which when said threaded body is turned into a complementary threaded body causes the longitudinal division of the thread in said complementary body and the shifting of a portion thereof into locking association with said element.

2. A self-locking screw threaded device including a threaded body, and a locking section including a relatively hard element integral with said body and positioned laterally with respect to an adjacent normal thread convolution, and a channel positioned along the side of said element, said element and channel being so positioned that when said threaded body is associated with a complementary threaded body said element will cause the longitudinal division of the thread in said complementary body and a portion thereof to be received by said channel and thereby position said divided thread section in locking association with said element.

3. A self-locking screw threaded device including a threaded body and a locking section including a relatively hard element integral with and positioned in the valley of adjacent thread convolutions of said body, and when said body is associated with a complementary threaded body causing the longitudinal division of the thread in said complementary body and the shifting of a divided thread section into locking association with said element.

4. A self-locking screw threaded device including a threaded body and a locking section including a relatively hard element integral with and positioned in the valley of adjacent thread convolutions of said body, and a complementary wall portion positioned along at least one side of said element, said element laterally displacing a portion at least of the thread counterpart of said valley when said threaded body is associated with a complementary threaded body and positioning said displaced portion of the thread in abutting relation with respect to said complementary wall portion.

5. A self-locking screw threaded device including a threaded body, and a locking section including a relatively hard element integral with and positioned within the valley of adjacent thread convolutions of said body and complementary wall portions positioned on opposite sides of said element, said element and wall portions being so positioned that when said threaded body is associated with a complementary threaded body, said element will cause at least a portion of the thread of said complementary body to be laterally displaced and interposed between said element and said wall portions.

6. A self-locking screw threaded device including a threaded body, and a locking section including a relatively hard element integral with the thread of said body and extending in helical parallelism therewith, said locking section also including a complemental wall portion extending out of helical alinement to one side of said element, said element and wall portion being so positioned that when said threaded body is associated with a complementary threaded body said element will cause at least a portion of the thread of said complementary body to be laterally displaced and interposed between said element and wall portion.

7. A self-locking screw threaded device including a threaded body, and a locking section including a relatively hard element integral with a thread convolution of said body, positioned laterally with respect to an adjacent normal thread convolution, and when turned into engagement with a complementary threaded body causing the longitudinal division of the thread in said complementary body, said element in circumferential cross-section diminishing in height toward one extremity to facilitate the division of the thread.

8. A self-locking screw threaded device including a threaded body, and a locking section including a relatively hard element integral with a thread convolution of said body, and when turned into engagement with a complementary threaded body causing the longitudinal division of the thread in said complementary body, said element extending in helical alinement within the valley in said first mentioned threaded body and having an intermediate portion which is higher than its extremities.

9. A self-locking screw threaded device including a threaded body, and a locking section including a relatively hard element integral with a thread convolution of said body, positioned to one side of a normal thread convolution, and when turned into engagement with a complementary threaded body causing the longitudinal division of the thread in said complementary body, said element having one extremity which is relatively blunt whereby to increase the force necessary to move the screw threaded device in a reverse direction after it has been operatively associated with said complementary body.

10. A self-locking screw threaded device including a threaded body, and a locking section including a relatively hard element integral with said body and extending helically in substantial parallelism with said thread, said element having an advancing extremity provided with a cutting edge and a deflecting side surface adapted to deflect material divided by said edge, said locking section also including an abutment surface cooperatively positioned with respect to said side surface of the cutting element, said element and abutment surface being so disposed that when said threaded body is associated with a complementary threaded body, said inclined side surface will cause lateral displacement of at least a portion of the thread of said complementary body into abutting relation with respect to said abutment surface.

11. A self-locking screw threaded device including a threaded body, and a locking section including a relatively hard element integral with said body and extending helically in substantial parallelism with said thread, said element being so positioned that when said threaded body is associated with a complementary threaded body, said element will cause at least a portion of the thread of said complementary body to be laterally displaced, said locking section also including an abutment surface out of helical alinement with respect to said thread and adapted to urge the thread portion displaced by said element toward normal helical alinement.

12. A self-locking screw threaded device including a threaded body, and a locking section including a relatively hard element integral with the thread of said body, said element being so positioned laterally with respect to a normal thread convolution that when said threaded body is associated with a complementary threaded body, said element will cause at least a portion of the thread of said complementary body to be laterally displaced, said locking section also including an abutment surface and a wall surface for urging the thread material displaced by said element into locking association with said abutment surface.

13. A self-locking screw threaded device including a threaded body, and a locking section including a relatively hard element integral with the thread of said body, said element being so positioned laterally with respect to a normal thread convolution that when said threaded body is associated with a complementary threaded body, said element will cause the thread of said complementary body to be longitudinally divided and the divided portions laterally displaced, said locking section also including abutment surfaces positioned adjacent the trailing extremity of said element and for urging in response to relative rotation between said threaded bodies said deflected thread portions toward each other.

14. A self-locking screw threaded device including a threaded body, and a locking section including a relatively hard element integral with the thread of said body, said element being so positioned laterally with respect to a normal thread convolution that when said threaded body is associated with a complementary threaded body, said element will cause the thread of said complementary body to be longitudinally divided and the divided portions laterally displaced, said locking section also including a pair of diverging abutment surfaces at one extremity of said element for allowing laterally displaced thread portions to separate when said threaded bodies are relatively rotated in a given direction, and a pair of converging abutment surfaces positioned at the opposite extremity of said element for urging said separated thread portions toward each other when said threaded bodies are relatively rotated in the opposite direction.

RICHARD T. HOSKING.